June 18, 1935.  C. C. FUERST  2,005,417
AIR VENT FOR CAMERA BELLOWS
Filed April 20, 1934
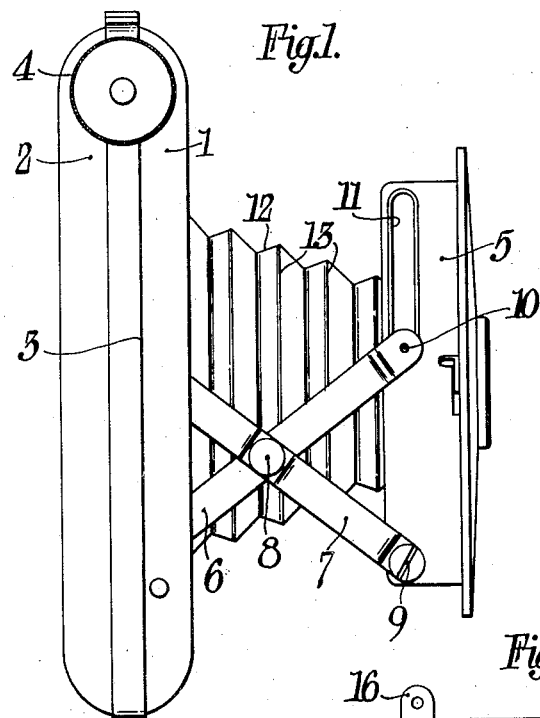
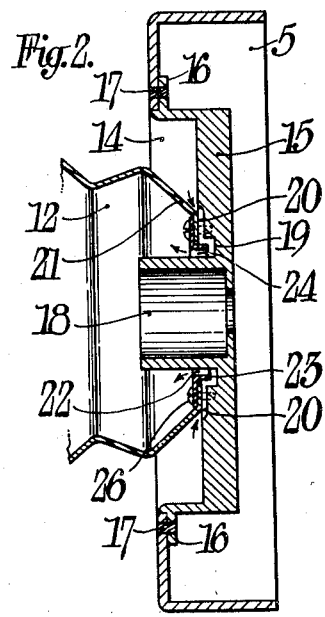
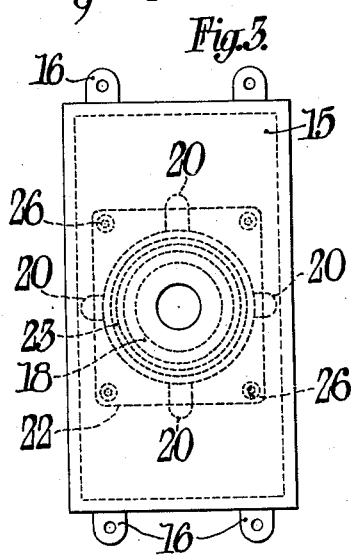
Inventor:
Carl C. Fuerst,
By
Attorneys Patented June 18, 1935

2,005,417

UNITED STATES PATENT OFFICE 2,005,417

AIR VENT FOR CAMERA BELLOWS

Carl C. Fuerst, Rochester, N. Y., assignor to Eastman Kodak Company, Rochester, N. Y., a corporation of New York Application April 20, 1934, Serial No. 721,470

4 Claims. (Cl. 95—39)

This invention relates to photography and more particularly to photographic cameras. One object of my invention is to provide an air vent for a camera bellows to facilitate opening and closing the camera. Another object of my invention is to provide an air vent which is simple in construction and which will be effectual in preventing light from leaking into the camera. Another object of my invention is to provide an air vent for cameras which does not require any extra parts. Another object of my invention is to provide an air vent for cameras which can be readily made from moldable material. Other objects will appear from the following specification, the novel features being particularly pointed out in the claims at the end thereof.

Coming now to the drawing wherein like reference characters denote like parts throughout:

Fig. 1 is a side elevation of a camera which may be equipped with an air vent constructed in accordance with and embodying a preferred form of my invention;

Fig. 2 is an enlarged fragmentary side elevation of the air vent between the front of the bellows and the shutter casing;

Fig. 3 is a front plan view of a portion of the shutter casing shown in Fig. 2.

I have illustrated my invention as applied to a simple type of camera here shown as consisting of a body portion 1 carrying a removable back 2 which may be separated from the camera body along the line 3 for loading the camera in the usual manner. The camera may be provided with a winding knob 4 to move the film past the exposure aperture.

The camera shutter is enclosed in a casing designated broadly as 5, this casing preferably being made rectangular in shape so as to provide supports for the supporting arms 6 and 7.

These arms are pivoted together at 8 and one arm 7 is pivotally attached to the shutter casing 5 by means of the stud 9. Arm 6 has a stud 10 which extends into and slides in the slot 11 cut in the shutter casing wall.

Between the camera body 1 and the shutter casing 5 there is a bellows 12 formed of a series of folds 13 so that when the shutter casing 5 is moved toward the camera body the bellows may fold.

In order to prevent air from accumulating in the bellows or to prevent the bellows from drawing the film forwardly through the exposure opening I have provided an air vent which permits the air to pass freely into the bellows as the camera is opened and out of the bellows as the camera is closed.

This is done without additional parts in the following manner: The shutter casing 5, as above explained, is generally rectangular in shape and is provided with a shallow recess 14 in the back. This recess may consist of an inverted box-like member 15 having a flange 16 riveted to the casing wall at 17 or member 15 and the shutter casing may all be molded in one part.

Whichever way this is constructed the shutter casing is provided with a rearwardly extending lens tube 18 around which there is an annular recess 19. From this annular recess slots 20 extend out beyond the inner edge 21 of the bellows 12 preferably in four directions. This is illustrated in Fig. 3 which shows the center portion or inverted box-like housing which forms a part of the complete shutter casing.

In order to hold the front edge of the bellows 12 attached to the shutter casing there is a plate 22 which may be rectangular in shape as shown in Fig. 3, this plate having a downwardly extending annular flange 23. This flange has an opening 24 somewhat larger than the outside diameter of the rearwardly extending lens tube 18 so as to leave a passage-way therethrough. Thus the air may pass freely in the direction shown by the arrows in Fig. 2 through the slots 20 around the end of the annular flange 23 and through the passage-way 24 into the bellows when the camera front 5 is being drawn out into a picture-taking position. When the camera is to be closed and the bellows collapsed, the air will pass through the same passage-way in an opposite direction.

It will be noted from the drawing and above description that the air vent is entirely formed between the shutter casing 5 and the end of the bellows 12 without the use of additional parts and yet the location of the air vent is arranged so that it is impossible for light to pass through the tortuous passage from behind the shutter casing 5 into the inside of the bellows 12.

The plate 22 may be attached to the shutter casing 5 by means of a plurality of screws 26 which may be tapped directly into part 15 of the shutter casing.

The structure of the shutter used in the shutter casing is fully shown in my copending application, Serial No. 699,362, filed November 23, 1933.

What I claim as new and desire to secure by Letters Patent of the United States is:

1. In a photographic camera having a bellows and a shutter, the combination with a shutter casing including a rearwardly extending lens tube having an annular slot there around and slots leading radially away from the tube, of a means for attaching the bellows to the shutter including a plate adapted to engage said bellows and having an annular flange projecting into the annular shutter recess, and means for holding said plate and bellows tightly against an unslotted portion of said camera shutter.

2. In a photographic camera having a bellows and a shutter, the combination with a shutter casing including a rearwardly extending lens carrier having a recess around the base thereof, said shutter casing including slots leading from the recess away from said lens carrier, of means for attaching a bellows to the shutter including an air vent therebetween comprising a plate adapted to engage the bellows, a flange extending from said plate into the shutter recess, the flange and recess being so proportioned that a space remains between these two parts, and means for holding the bellows and plate against unslotted portions of the shutter.

3. In a camera, the combination with a camera body, a bellows attached to the camera body, a shutter casing having a shallow recess in a back wall thereof, means for attaching the bellows directly to the shutter casing in the shallow recess, and cooperating spaced flanges on the bellows attaching means and in the shutter recess permitting the free circulation of air therethrough.

4. In a camera, the combination with a camera body, a bellows attached to the camera body, a shutter casing having a slotted shallow recess in the back wall thereof, a plate adapted to hold the bellows upon the shutter and in the shallow recess and overlying portions of the slots therein, and spaced cooperating flanges in the bellows fastening plate and shutter adapted to form with the slots a light-tight air passageway.

CARL C. FUERST.